US009563386B2

(12) United States Patent
Morita

(10) Patent No.: US 9,563,386 B2
(45) Date of Patent: Feb. 7, 2017

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/844,509

(22) Filed: Sep. 3, 2015

(65) Prior Publication Data

US 2016/0077770 A1    Mar. 17, 2016

(30) Foreign Application Priority Data

Sep. 12, 2014   (JP) ................................. 2014-186530

(51) Int. Cl.
*G06F 3/12*          (2006.01)

(52) U.S. Cl.
CPC ........... *G06F 3/1205* (2013.01); *G06F 3/1253* (2013.01); *G06F 3/1256* (2013.01); *G06F 3/1285* (2013.01)

(58) Field of Classification Search
CPC .... G06F 3/1205; G06F 3/1209; G06F 3/1256; G06F 3/1253; G06F 3/1285
USPC ............................................. 358/1.13, 1.15
See application file for complete search history.

(56) References Cited

U.S. PATENT DOCUMENTS

| | | | | |
|---|---|---|---|---|
| 7,408,674 B2* | 8/2008 | Moro | ..................... | G06K 15/00 270/1.01 |
| 7,619,765 B2* | 11/2009 | Kimura | ................. | G06F 3/1204 358/1.11 |
| 7,916,325 B2* | 3/2011 | Ebuchi | .................. | G06F 3/1207 358/1.15 |
| 8,767,227 B2* | 7/2014 | Konji | ..................... | G06F 3/122 358/1.13 |
| 2008/0074694 A1* | 3/2008 | Saida | ..................... | G06K 15/00 358/1.15 |
| 2008/0094659 A1* | 4/2008 | Ito | ......................... | G06F 3/1204 358/1.15 |
| 2011/0205579 A1* | 8/2011 | Nagano | ................. | G06F 3/1204 358/1.15 |

FOREIGN PATENT DOCUMENTS

JP           2006-92289 A        4/2006

* cited by examiner

*Primary Examiner* — Allen H Nguyen
(74) *Attorney, Agent, or Firm* — Canon U.S.A., Inc. IP Division

(57) ABSTRACT

An information processing apparatus includes an acquisition unit configured to acquire printer information from a printer, a display unit configured to, by being called from a first print setting screen offered by an operating system, display a second print setting screen offered by a device application based on the printer information, and a responding unit configured to, if the first print setting screen is called from the second print setting screen, transmit capability information as a response, based on the printer information, wherein the first print setting screen is displayed based on the capability information transmitted by the responding unit as the response.

11 Claims, 17 Drawing Sheets

FIG. 4

```
*Feature:Media Type
{
   *Option:NONE
   {
      *Name:="NOT SPECIFIED"
   }
   *Option:STANDARD
   {
      *Name:="PLAIN PAPER"
   }
   *Option:Paste Board
   {
      *Name:="THICK PAPER"
   }
   *Option:Thin
   {
      *Name:="THIN PAPER"
   }
   *Option:Recycled
   {
      *Name:="RECYCLED PAPER"
   }
}
```

```xml
<?xml version="1.0" encoding="UTF-8"?>
<psf:PrintCapabilities ... >
 ...
 <psf:Feature name="psk:PageMediaType">
  <psf:Property name="psk:DisplayName">
   <psf:Value xsi:type="xsd:string">PAPER TYPE</psf:Value>
  </psf:Property>
  <psf:Property name="psf:SelectionType">
   <psf:Value xsi:type="xsd:QName">psk:PickOne</psf:Value>
  </psf:Property>
  <psf:Option name="psk:None" constrained="psk:None">
   <psf:Property name="psk:DisplayName">
    <psf:Value xsi:type="xsd:string">NOT SPECIFIED</psf:Value>
   </psf:Property>
  </psf:Option>
  <psf:Option name="psk:Plain" constrained="psk:None">
   <psf:Property name="psk:DisplayName">
    <psf:Value xsi:type="xsd:string">PLAIN PAPER</psf:Value>
   </psf:Property>
   <psf:Property name="ns0000:MediaId">
    <psf:Value xsi:type="xsd:integer">3</psf:Value>
   </psf:Property>
  </psf:Option>
  <psf:Option name="ns0000:PasteBoard" constrained="psk:None">
   <psf:Property name="psk:DisplayName">
    <psf:Value xsi:type="xsd:string">THICK PAPER</psf:Value>
   </psf:Property>
   <psf:Property name="ns0000:MediaId">
    <psf:Value xsi:type="xsd:integer">8</psf:Value>
   </psf:Property>
  </psf:Option>
  ...
 </psf:Feature>

<psf:PrintCapabilities>
```

FIG. 6

```xml
<?xml version="1.0" encoding="UTF-8"?>                          601
<psf:PrintCapabilities ... >
 ...
  <psf:Feature name="psk:PageMediaType">
    <psf:Property name="psk:DisplayName">
      <psf:Value xsi:type="xsd:string">PAPER TYPE</psf:Value>
    </psf:Property>
    <psf:Property name="psf:SelectionType">
      <psf:Value xsi:type="xsd:QName">psk:PickOne</psf:Value>
    </psf:Property>
    <psf:Option name="psk:None" constrained="psk:None">
      <psf:Property name="psk:DisplayName">
        <psf:Value xsi:type="xsd:string">NOT SPECIFIED</psf:Value>
      </psf:Property>
    </psf:Option>
    <psf:Option name="psk:Plain" constrained="psk:None">
      <psf:Property name="psk:DisplayName">
        <psf:Value xsi:type="xsd:string">PLAIN PAPER</psf:Value>
      </psf:Property>
      <psf:Property name="ns0000:MediaId">
        <psf:Value xsi:type="xsd:integer">3</psf:Value>
      </psf:Property>
    </psf:Option>
    <psf:Option name="ns0000:PasteBoard" constrained="psk:None">
      <psf:Property name="psk:DisplayName">
        <psf:Value xsi:type="xsd:string">THICK PAPER</psf:Value>
      </psf:Property>
      <psf:Property name="ns0000:MediaId">
        <psf:Value xsi:type="xsd:integer">8</psf:Value>
      </psf:Property>
    </psf:Option>
    ...                                                         602
    <psf:Option name="ns0000:SPECIALCOATEDPAPER" constrained="psk:None">
      <psf:Property name="psk:DisplayName">
        <psf:Value xsi:type="xsd:string">SPECIALCOATEDPAPER</psf:Value>
      </psf:Property>
      <psf:Property name="ns0000:MediaId">
        <psf:Value xsi:type="xsd:integer">9876</psf:Value>
      </psf:Property>
    </psf:Option>
  </psf:Feature>

<psf:PrintCapabilities>
```

FIG. 7A

| NAME | GRAMMAGE | SURFACE NATURE |
|---|---|---|
| PLAIN PAPER | 77g/m² | QUALITY PAPER |
| THICK PAPER | 128g/m² | QUALITY PAPER |
| THIN PAPER | 58g/m² | QUALITY PAPER |
| RECYCLED PAPER | 77g/m² | RECYCLED PAPER |

[REGISTER] [DELETE]

FIG. 7B

| NAME | SPECIAL COATED PAPER |
|---|---|
| GRAMMAGE | 80g/m² |
| SURFACE NATURE | TWO-SIDED COATED PAPER |

[OK] [CANCEL]

FIG. 8

```
<?xml version="1.0" encoding="utf-8"?>
<Properties xmlns="···" >
    <Property name="ExtraPapaers">
        <ExtraPapaer>
            <Property name="ExtraMediaOption">
                <String>ns0000:SPECIALCOATEDPAPER</String>
            </Property>
            <Property name="ExtraMediaDisplayName">
                <String>SPECIALCOATEDPAPER</String>
            </Property>
            <Property name="ExtraMediaID">
                <Number>9876</Number>
            </Property>
            <Property name="ExtraMediaWeight">
                <Number>80</Number>
            </Property>
            <Property name="ExtraMediaBackCoating">
                <String>psk:glossy</String>
            </Property>
            <Property name="ExtraMediaFrontCoating">
                <String>psk:glossy</String>
            </Property>
            <Property name="ExtraMediaMaterial">
                <String>psk:Paper</String>
            </Property>
            <Property name="ExtraMediaPrePrinted">
                <String>psk:None</String>
            </Property>
            <Property name="ExtraMediaPrePunched">
                <String>psk:None</String>
            </Property>
            <Property name="ExtraMediaRecycled">
                <String>psk:None</String>
            </Property>
        </ExtraPapaer>
        ···
</Properties>
```

801
802

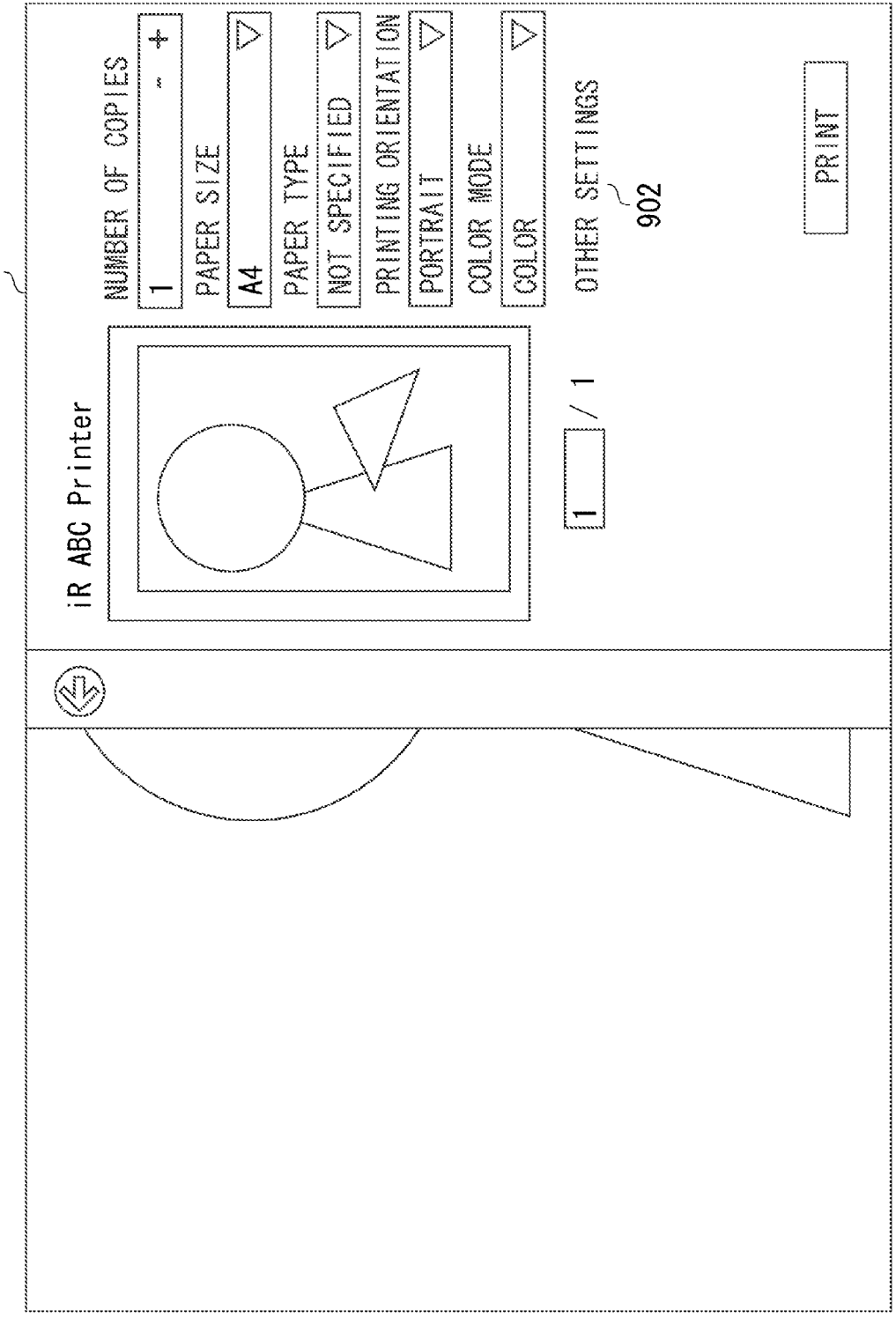

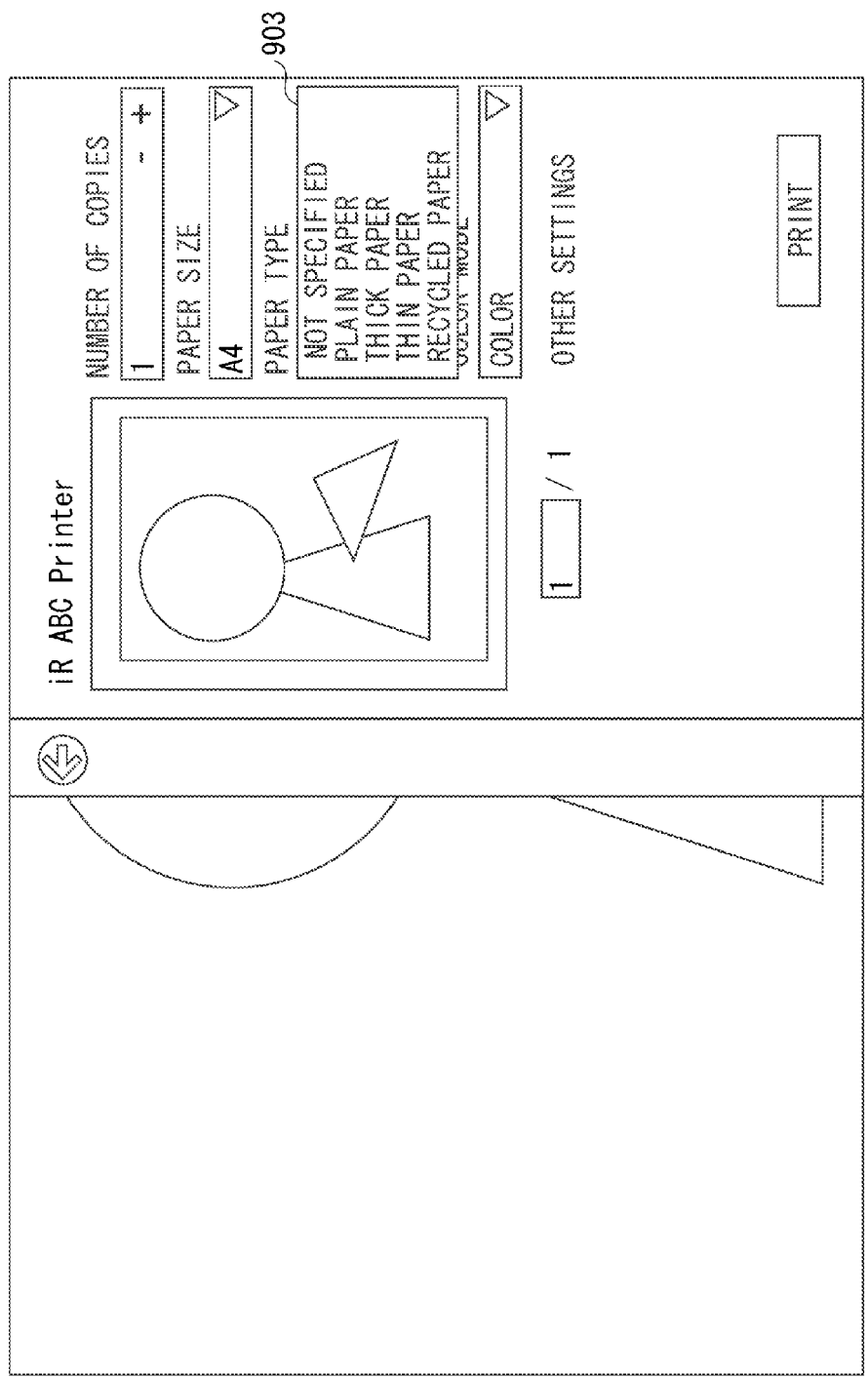

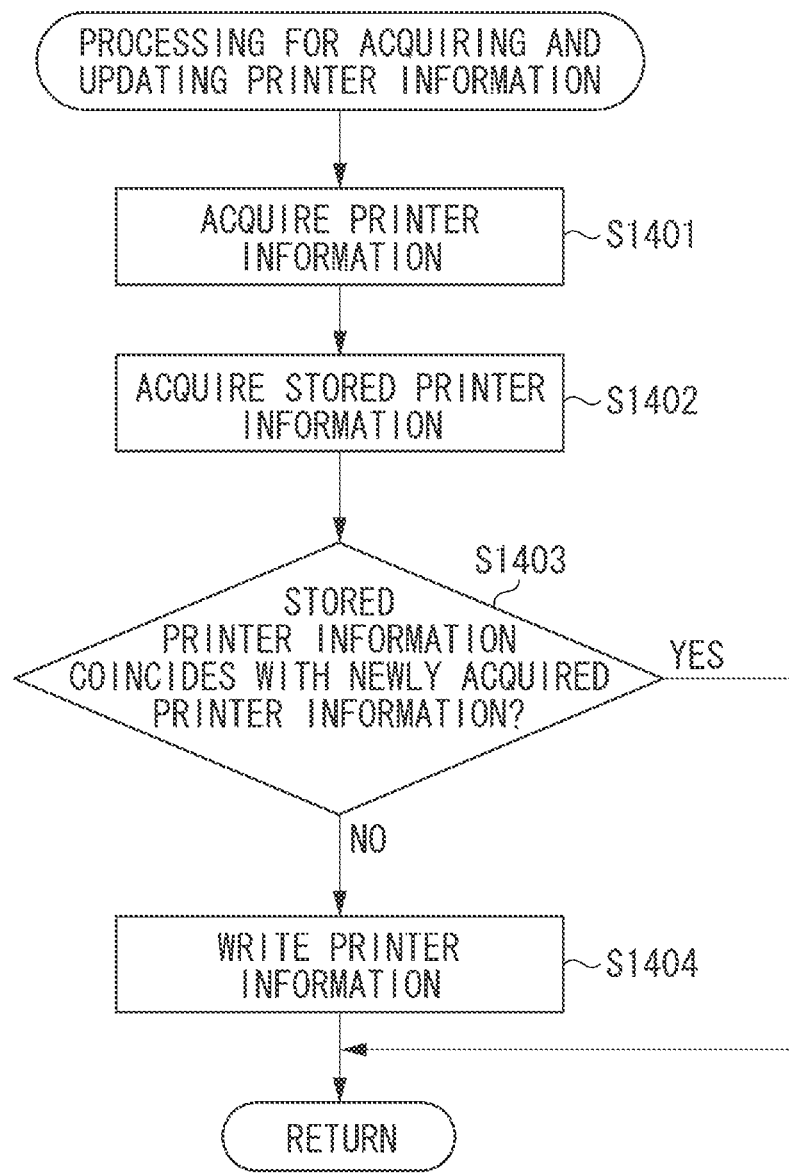

# INFORMATION PROCESSING APPARATUS, CONTROL METHOD, AND STORAGE MEDIUM

BACKGROUND

Field

Aspects of the present invention generally relates to a technique for displaying a print setting screen.

Description of the Related Art

Conventionally, there has been a function of allowing a user to set paper information in a printer to meet a demand for performing printing on a type of paper other than types of paper set in the printer at the time of shipment. Japanese Patent Application Laid-Open No. 2006-92289 discusses a technique for acquiring user-defined paper formation from a printer and listing it.

As such, there has conventionally been a technique for acquiring information from a printer and displaying it.

SUMMARY

The present specification describes an environment where a first print setting screen offered by an operating system calls a second print setting screen offered by a device application, and other setting items that cannot be set in the first print setting screen are set in the second print setting screen.

In such an environment, if print setting screen display control based on information acquired from a printer is simply performed in the second print setting screen offered by the device application, an inconvenience will arise. For example, a content selected in the second print setting screen is not reflected onto the contents of the first print setting screen.

Japanese Patent Application Laid-Open No. 2006-92289 does not discuss such a problem. Therefore, a similar inconvenience may arise in the above-described environment.

The present specification describes methods for displaying both the first print setting screen offered by the operating system and the second print setting screen offered by the device application based on the information acquired from the printer. Aspects of the present invention are directed to offering a user-friendly print setting screen with these methods.

According to an aspect of the present invention, an information processing apparatus includes an acquisition unit configured to acquire printer information from a printer, a display unit configured to, by being called from a first print setting screen offered by an operating system, display a second print setting screen offered by a device application based on the printer information, and a responding unit configured to, if the first print setting screen is called from the second print setting screen, transmit capability information as a response, based on the printer information, wherein the first print setting screen is displayed based on the capability information transmitted by the responding unit as the response.

Further features of the present disclosure will become apparent from the following description of exemplary embodiments with reference to the attached drawings.

BRIEF DESCRIPTION OF THE DRAWINGS

FIG. 4 illustrates a printer information definition file.

FIG. 5 illustrates a capability information definition file.

FIG. 6 illustrates the capability information definition file after acquisition of extended printer capabilities.

FIGS. 7A and 7B illustrate examples of paper type registration screens.

FIG. 8 illustrates an acquired printer information definition file.

FIGS. 9A and 9B illustrate examples of paper type options in a print setting screen.

FIG. 14 is a flowchart illustrating processing for acquiring and updating the printer information.

DESCRIPTION OF THE EMBODIMENTS

Exemplary embodiments will be described below with reference to the accompanying drawings.

Figure 1:
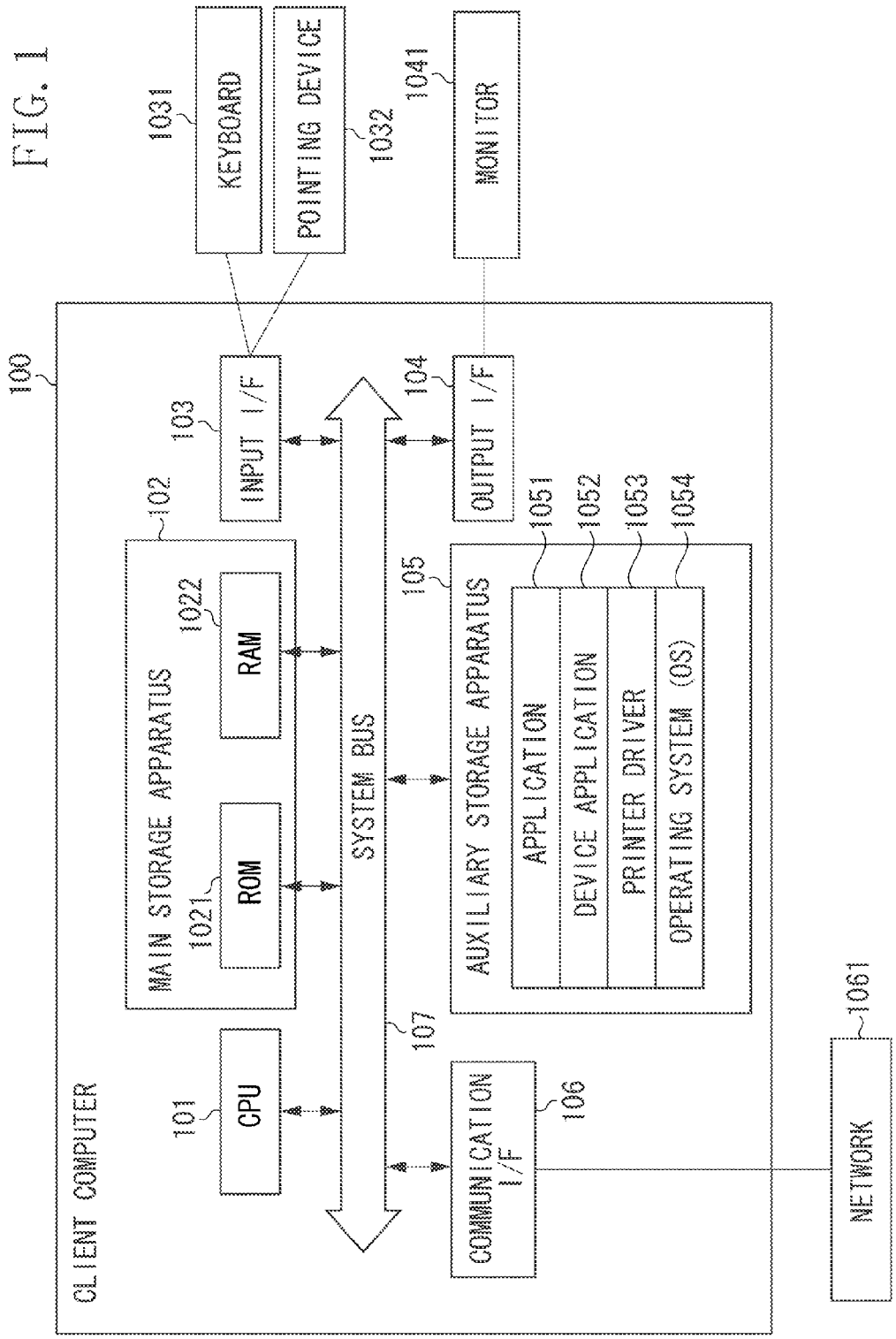
FIG. 1 is a block diagram illustrating a hardware configuration and a software configuration of a computer system.

FIG. 1 is a block diagram illustrating a configuration of a system using an ordinary computer according to a first exemplary embodiment of the present invention.

A central processing unit (CPU) 101 controls an entire client computer 100 as an example information processing apparatus according to a program stored in a read only memory (ROM) 1021 and a random access memory (RAM) 1022 of a main storage apparatus 102, or in an auxiliary storage apparatus 105.

Figure 3:
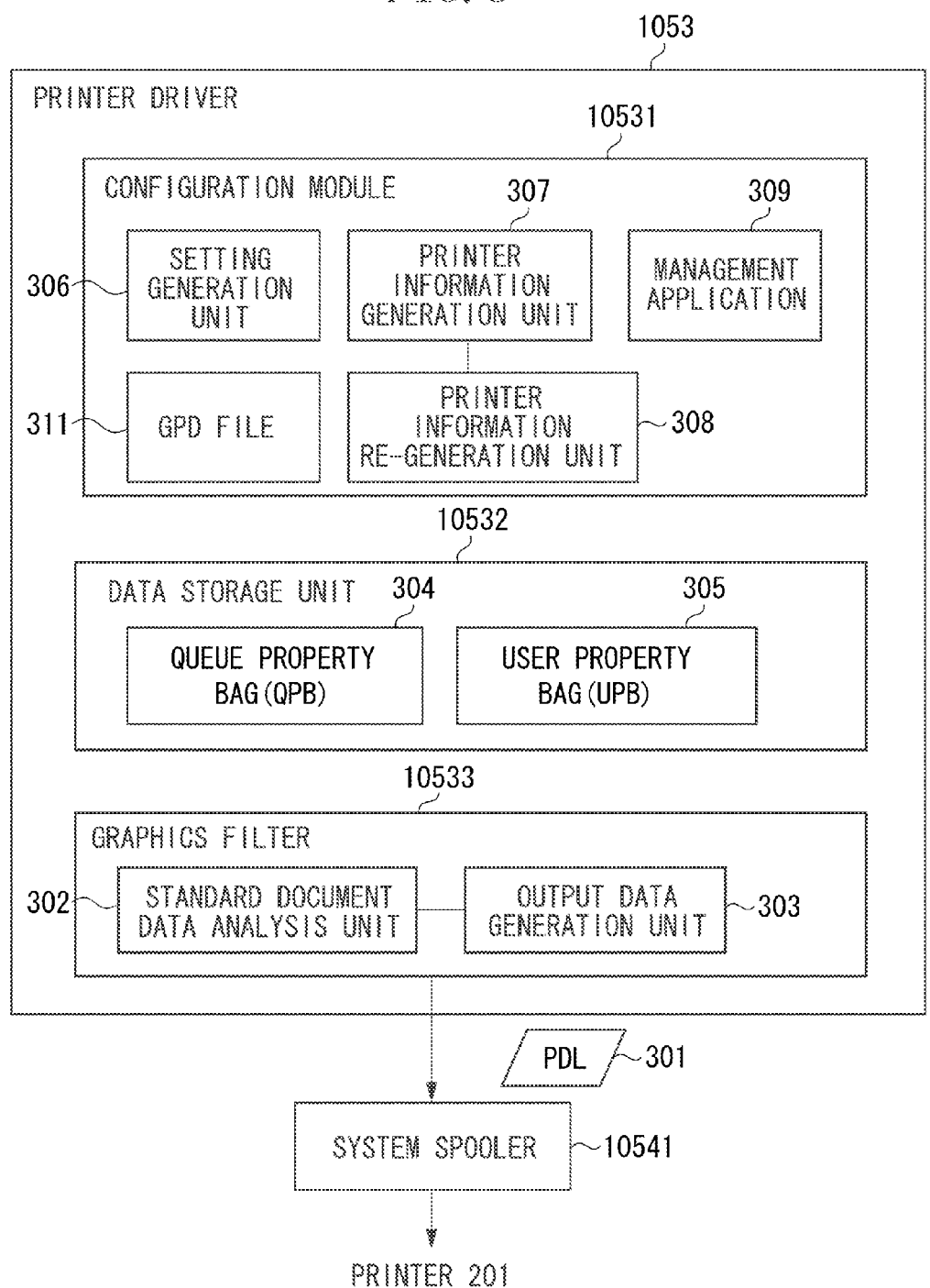
FIG. 3 is a block diagram illustrating a configuration of a printer driver.

In addition, a software configuration of the client computer 100 as illustrated in FIG. 3 and processing in each step of flowcharts (described below) are implemented by the CPU 101 performing processing based on programs stored in the auxiliary storage apparatus 105.

The RAM 1022 also serves as a work area used by the CPU 101 to perform various processing. The auxiliary storage apparatus 105 stores various programs such as an application 1051, a device application 1052, a printer driver 1053, and an operating system (OS) 1054. Input apparatuses such as a keyboard 1031 and a pointing device 1032 typified by a mouse and a touch panel are connected to the client computer 100 via an input interface (I/F) 103. An output device such as a monitor 1041 is connected to an output I/F 104. The connected monitor 1041 displays a user interface (UI) according to an instruction from a program. The CPU 101 receives an operation from a user to a program via the above-described input and output apparatuses. A communication I/F 106 is connected to a network 1061 to enable communication with external apparatuses for the client computer 100, such as a client computer 202 and a printer 201 illustrated in FIG. 2. The above-described modules are mutually connected via a system bus 107 enabling data exchange between them. The applications 1051 to 1054 including processing according to the present exemplary embodiment can be added to the auxiliary storage apparatus 105 via a compact disc read only memory (CD-ROM) and a universal serial bus (USB) memory (not illustrated). The applications 1051 to 1054 can further be added to the auxiliary storage apparatus 105 via the network 1061. Unless otherwise noted, the system is applicable to the present exemplary embodiment regardless of the apparatus configuration as long as functions of the present exemplary embodiment can be executed. More specifically, a single apparatus, a system composed of a plurality of apparatuses, and a system that is connected via a network such as a local area network (LAN) and a wide area network (WAN), can be employed to perform processing according to the present exemplary embodiment.

Figure 2:
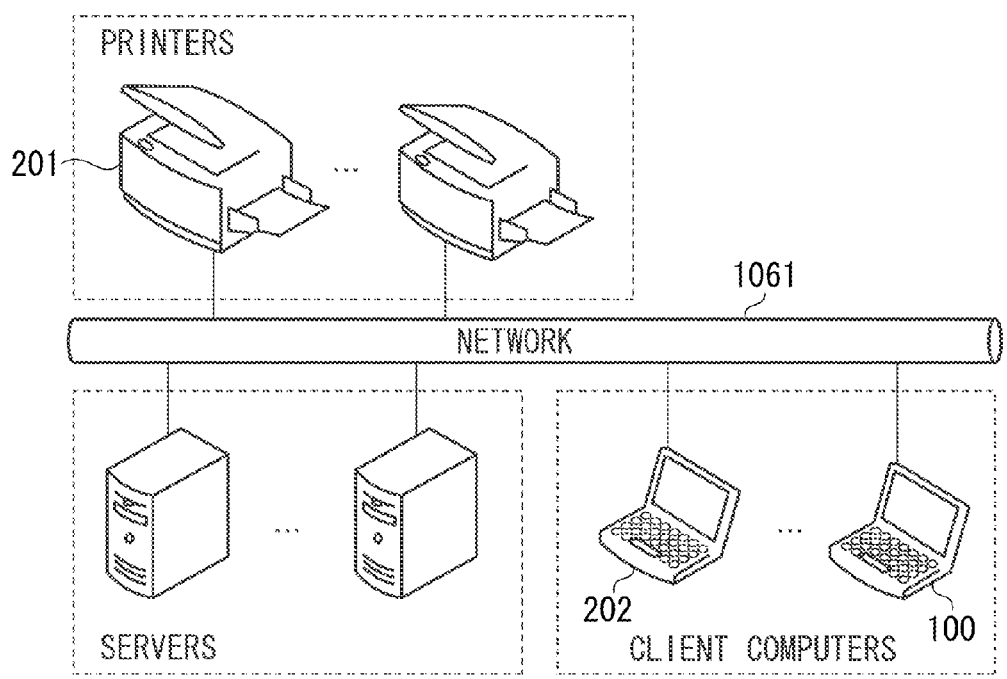
FIG. 2 illustrates a configuration of a network to which clients and printers are connected.

FIG. 2 schematically illustrates an environment of the network 1061 according to the present exemplary embodiment. A single or a plurality of the client computers 100 and 202 for generating a printing target document and image are connected to the network 1061. Further, a single or a plurality of the printers 201 may be connected to the network 1061. The network 1061 may be configured in any scale ranging from a small-scale network such as a personal area network (PAN) and a LAN to a large-scale network. All of the above-described apparatuses are connected to the network 1061. Servers and printers may exist on the Internet, such as the "cloud", connected to the network 1061.

FIG. 3 is a block diagram of a printer driver 1053 as an example software module according to the present exemplary embodiment. In the present exemplary embodiment, in particular, a configuration module 10531, a data storage unit 10532, and a graphics filter 10533 configuring the printer driver 1053 will be described below. These software modules are stored in the auxiliary storage apparatus 105. In response to a user request and a request from another system, these modules are loaded from the auxiliary storage apparatus 105 into the RAM 1022 and then executed by the CPU 101. The application 1051 is a general application such as a word processor and a browser. The application 1051 displays a UI on the monitor 1041 and receives a user's printing request via input apparatuses such as the pointing device 1032 and the keyboard 1031. In response to the user's printing request, the application 1051 issues a printing request to a printing system (not illustrated). The printing system is a subsystem of the OS 1054. The printing system is disposed between the application 1051 and the printer driver 1053 and performs common processing in print processing. Specific processing includes the selection of a printing target printer, the generation of setting information via the selected printer driver 1053, and the conversion of setting information into Page Description Language (PDL) print document data 301 generally interpretable by printers. The printer driver 1053 is a module in charge of processing that depends on the printing target printer. The configuration module 10531 performs the acquisition and generation of information about settings that can be implemented by the printer 201. Relevant processing will be described in detail below.

The data storage unit 10532 includes a Queue Property Bag (QPB) area 304 and a User Property Bag (UPB) area 305 for storing data to be used by the printer driver 1053. The QPB area 304 is an area for storing setting information related to drivers for the entire system. Although this area can be referred to by all users registered in the computer, the administrator authority is required to operate the area, for example, to update the contents thereof. Printer information is stored in the QPB area 304 during processing illustrated in FIG. 14 (described below). The UPB area 305 is an area for storing data of drivers which are individually used by respective users. Execution users are respectively provided with different data areas. An execution user is not restricted from referring to or updating the contents of the area assigned to the execution user, and basically is not allowed to access areas assigned to other users. The graphics filter 10533 receives standard document data including setting information generally interpretable by printers from the application 1051 via the printing system, and analyzes the data via a standard document data analysis unit 302. Then, the graphics filter 10533 converts the data into PDL data 301 interpretable by the printer 201 via an output data generation unit 303. The converted PDL data is transferred to a system spooler 10541 (a subsystem of the OS 1054) and then is transmitted to the printer 201.

FIG. 4 illustrates an example of a Generic Printer Description (GPD) file 311 which is setting information generated based on the printer information. The GPD file 311 defines functions of the printer driver 1053 and describes various setting information that can be input via the printer driver 1053.

The setting information includes information about the number of copies, a paper orientation, a paper size, a paper type, one-sided/two-sided printing, and a paper feed method. FIG. 4 selectively illustrates an example of paper type definition.

More specifically, the setting information includes information such as "Not Specified" (NONE), "Plain Paper" (STANDARD), and "Thick Paper" (PasteBoard) displayed as options for setting items 903 in a print setting screen 901 illustrated in FIG. 9B (described below).

The values "STANDARD" and "PasteBoard" of the Option attribute correspond to the ID of a paper type specification to be reflected onto a printing command generated by the printer driver 1053. The values "Plain Paper" and "Thick Paper" of the Name attribute correspond to texts to be displayed in the print setting screen 901 offered by the OS 1054.

FIG. 5 illustrates an example of a PrintCapabilities definition file 501 (describing capability information indicating the capabilities of the printer 201) exchanged between software modules. This information is generated by a setting generation unit 306. Based on this information, various setting screens such as the print setting screen 901 offered by the OS 1054 and an advanced setting screen 1001 (print setting screen) offered by the device application 1052 display functions and setting items.

Information indicating functions of the printer 201 includes the GPD file 311 generated based on the printer information at the time when the driver is installed. In addition, functions and setting items may be extended when a device such as a finisher is attached to the printer 201 or when a screen on the printer 201 is operated. An example of registering a new paper type (User-Set Paper) to the printer 201 will be described below.

FIG. 7A illustrates an example of a screen 701 for registering a new paper type to the printer 201.

Since each paper type has physical characteristics such as grammage and surface nature, the printer 201 needs to perform print control according to the physical characteristics of each paper type. However, the physical characteristics of the paper type to be actually used by the user often suit none of paper types predetermined at the time of shipment of the printer 201.

To cope with such a case, the printer 201 is provided with an input method that enables registering information about a new paper type (User-Set Paper) together with physical characteristics of the new paper type. A table 702 of the screen 701 displays a list of currently registered paper types. When the user presses a register button 703, the screen 701 shifts to a screen 705 illustrated in FIG. 7B for inputting information about a new paper type. When the user presses a delete button 704, a registered paper type can be deleted.

FIG. 7B illustrates an example of the screen 705 for inputting information about a new paper type. On the screen 705, the user inputs attributes such as a name 706, a grammage 707, and a surface nature 708 of the new paper type. When the user presses an OK button 709, the new paper type is registered and the information thereof is reflected to the table 702.

The new paper type can be registered to the printer 201 with the above-described procedures.

FIG. 8 illustrates an example of printer information 801 that has been acquired from the printer 201 and then stored in the data storage unit 10532. FIG. 8 selectively illustrates information about paper types to be used in the present exemplary embodiment. The printer information 801 indicates data stored in the data storage unit 10532 in step S1405 illustrated in FIG. 14 (described below), i.e., extended capabilities acquired from the printer 201.

The information about paper types is represented in such a manner that the Name attribute of the "Property" element is specified by the "ExtraPapers". User-set paper information 802 includes Property elements. A parameter that is a child element of the Property element can be acquired by specifying the Name attribute. Although the String and the Number elements are described as child elements of the Property element, other elements may also be described. Further, data having another data structure such as JavaScript Object Notation (JSON) may be included in each element.

Although the paper type as an extended capability acquired in the present exemplary embodiment is only the user-set paper information 802, information similar to the user-set paper information 802 may be enumerated in succession in the case of a plurality of paper types.

Figure 10:
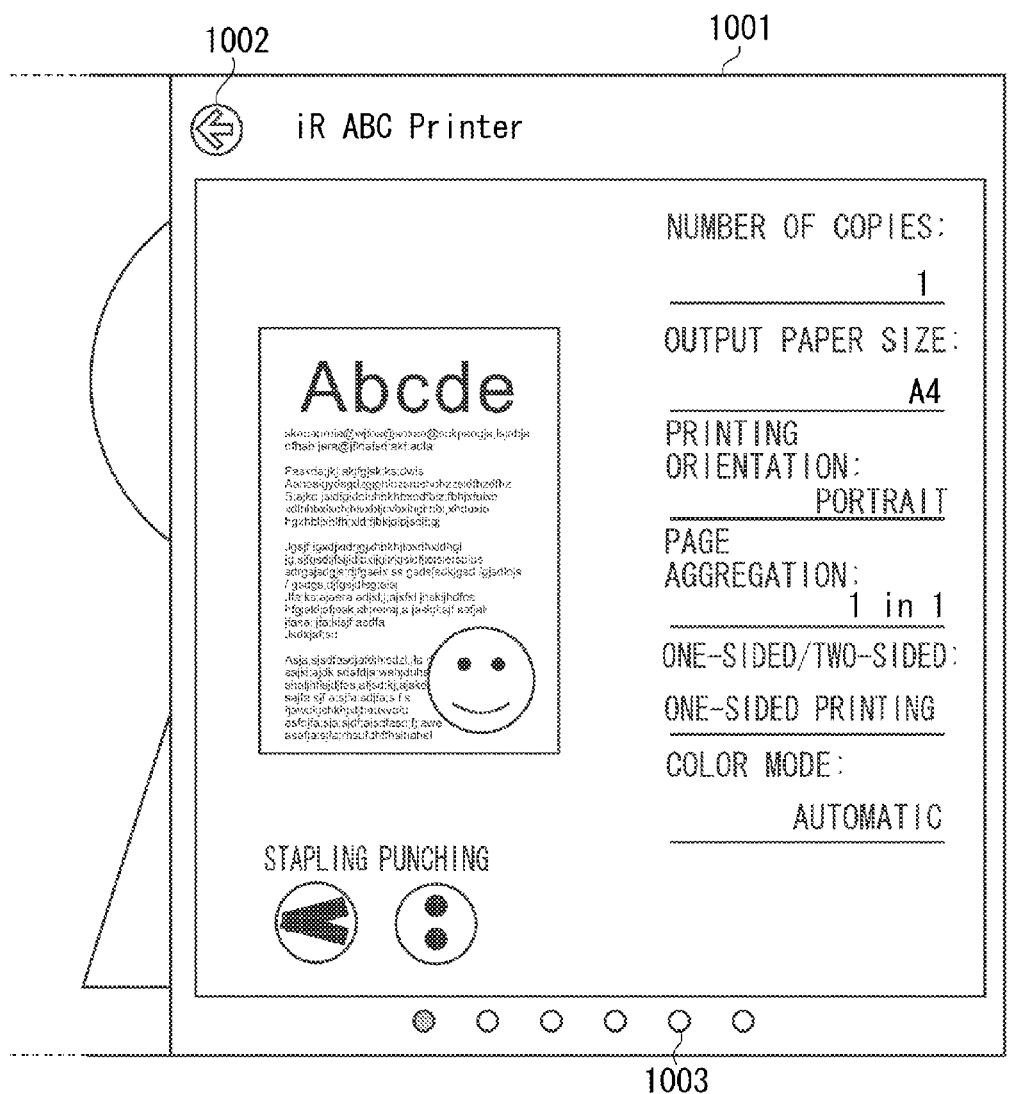
FIG. 10 illustrates an advanced setting screen.

Supplementary information required to describe processing according to the present exemplary embodiment will be provided below, with reference to FIGS. 9A, 9B, and 10.

Figure 11A:
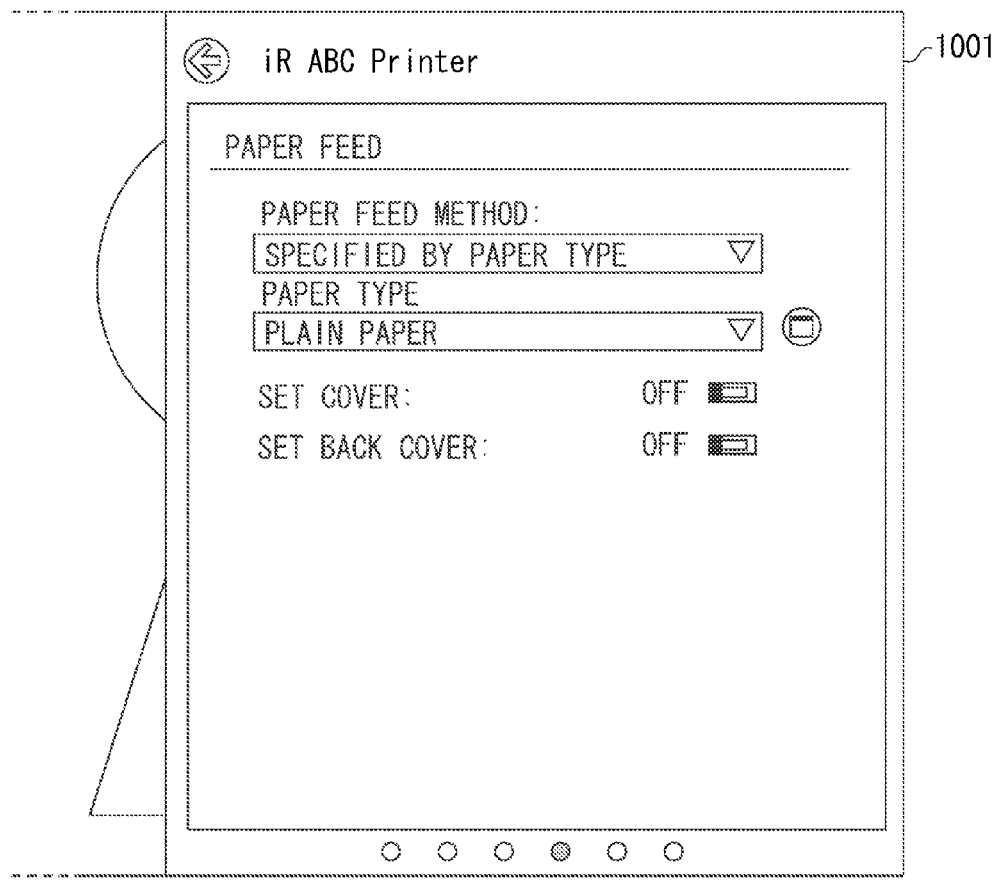
FIGS. 11A and 11B illustrate examples of a paper type setting screen in the advanced setting screen.

The print setting screen 901 is implemented by a driver framework function offered by the OS 1054. The print setting screen 901 offered by the OS 1054 displays only a part of print setting items such as "Number of Copies" and "Paper Size" out of print setting items related to all of functions provided by the printer 201. Therefore, when performing a setting related to a function not displayed in the print setting screen 901, the user presses "Other Settings" 902. Then, the screen shifts to an advanced setting screen 1001 that is a print setting screen offered by the device application 1052 (hereinafter simply referred to as an advanced setting screen 1001). The advanced setting screen 1001 includes a plurality of pages. The user is also able to change the page to another page as illustrated in FIGS. 10 and 11A by pressing a page change button 1003, flicking the touch screen, or operating the keyboard, and then make settings. Then, the user performs required settings and then presses a return button 1002 in the advanced setting screen 1001. The screen returns to the print setting screen 901 and the setting changes made on the advanced setting screen 1001 are reflected onto the print settings. For print setting items common to the print setting screen 901 and the advanced setting screen 1001, the contents set in the advanced setting screen 1001 are also reflected onto the print setting screen 901.

Although, in the present exemplary embodiment, UI transition is performed through screen shift from the print setting screen 901 to the advanced setting screen 1001, another mechanism such as activation of a dialog is also applicable to the present exemplary embodiment as long as settings are mutually reflected between a plurality of screens after shifting therebetween.

As described above, when performing printing with advanced settings, the user suitably shifts the screen from the print setting screen 901 to the advanced setting screen 1001, and performs settings and printing. A problem may arise during this processing. Specific examples will be described below.

Figure 11B:
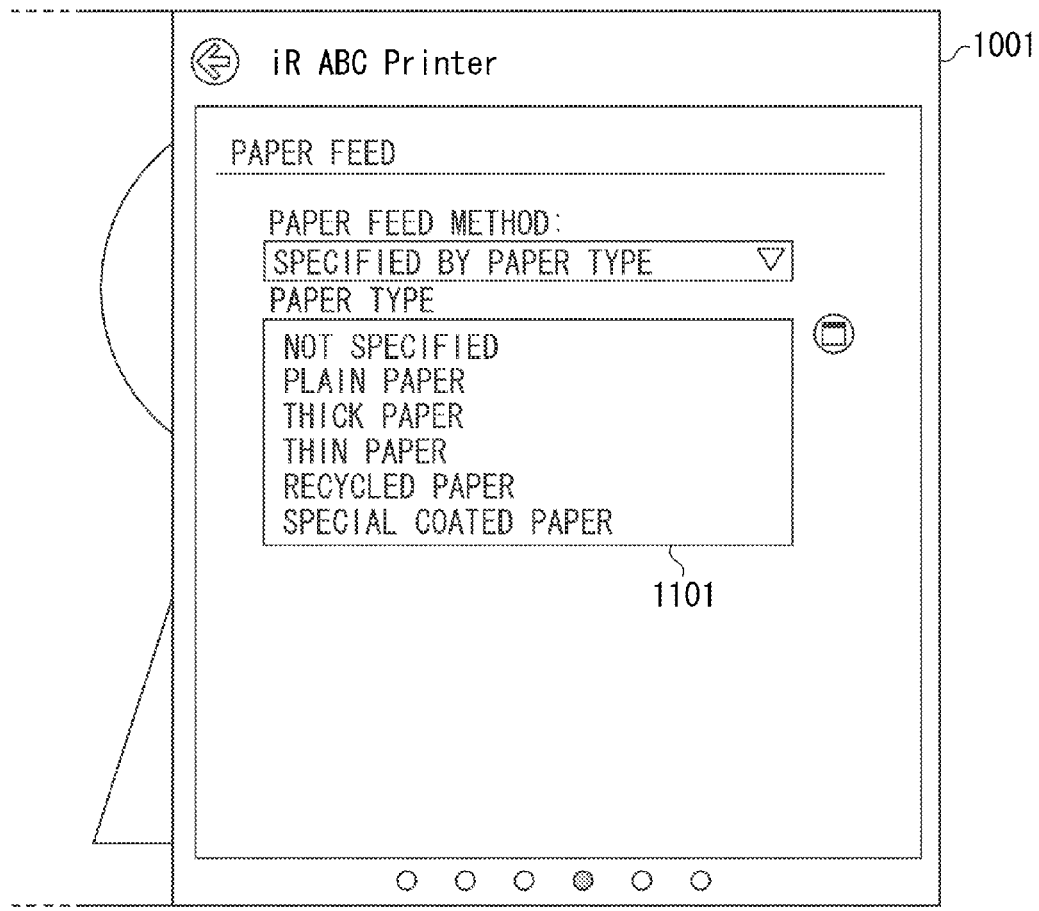

An option "Special Coated Paper" is not included in the setting items 903 in the print setting screen 901 illustrated in FIG. 9B. On the other hand, the option "Special Coated Paper" is included in setting items 1101 in the advanced setting screen 1001 illustrated in FIG. 11B, which are displayed based on the printer information acquired from the printer 201. Therefore, if the user sets "Special Coated Paper" and then presses the return button 1002 in the advanced setting screen 1001, the print setting screen 901 not having the setting value of "Special Coated Paper" does not display the option "Special Coated Paper". Then, in the print setting screen 901, although a setting value of the setting items 903 can be changed to "Plain Paper" or the like, the setting value cannot be restored to "Special Coated Paper" in this case.

A cause of this problem will be described below. In the advanced setting screen 1001, each vendor is able to uniquely define processing and therefore is able to freely increase or decrease the number of options. On the other hand, the OS 1054 uses only the information described in the PrintCapabilities definition file 501 to display the setting items 903 in the print setting screen 901. In addition, the OS 1054 generates the PrintCapabilities definition file 501 based on the printer information at the time when the driver is installed. More specifically, the options displayed for the setting items 903 in the print setting screen 901 are only options determined when the driver is installed. Therefore, when a setting item such as "Special Coated Paper" is added to the printer 201 after installation of the driver, a problem will arise. For example, "Special Coated Paper" can be selected only in the advanced setting screen 1001, and the print setting screen 901 and the advanced setting screen 1001 display different contents.

To solve this problem, before the OS 1054 acquires the printer information and generates the PrintCapabilities definition file 501, extended processing is inserted to change the setting items 903 displayed in the print setting screen 901. These pieces of processing are performed by a printer information generation unit 307 and a printer information re-generation unit 308, and will be described below with reference to the flowchart illustrated in FIG. 13. Unless otherwise noted, the processing of this flowchart is to be performed by the device application 1052 operating on the OS 1054.

In step S1301, the device application 1052 receives a PrintCapabilities (capability information) acquisition request issued by the OS 1054. This request is issued at the timing when a general application displays the print setting screen 901 to perform printing or when the screen returns from the advanced setting screen 1001 to the print setting screen 901.

In step S1302, the device application 1052 acquires the printer information from the printer 201.

In step S1303, the device application 1052 acquires the acquired printer information 801 that has been acquired from the printer 201 and then stored in the QPB area 304 before step S1302.

In step S1304, the device application 1052 determines whether acquisition of the printer information 801 has succeeded in step S1303. When acquisition of the printer information 801 has succeeded (YES in step S1304), the processing proceeds to step S1305. On the other hand, when acquisition of the printer information 801 has failed (NO in step S1304), the processing proceeds to step S1307.

In step S1305, the device application 1052 adds the information registered in the printer information 801 acquired in step S1303 to the printer information acquired in step S1302 to generate a PrintCapabilities definition file 601 to which information 602 related to "Special Coated Paper" illustrated in FIG. 6 is added.

In step S1307, the device application 1052 generates the PrintCapabilities definition file 601 to which the information 602 related to "Special Coated Paper" illustrated in FIG. 6 is added by using only the printer information acquired in step S1302.

In step S1306, the device application 1052 responds to the caller (the OS 1054 in this case) with the PrintCapabilities definition file 601 generated in step S1305 or S1307.

With the above processing, based on the paper information set on the printer 201, options are added to the print setting screen 901 offered by the OS 1054.

FIG. 14 illustrates processing for acquiring from the printer 201 the extended printer information including a paper type added to the printer 201 (for example, "Special Coated Paper") and storing the printer information in the data storage unit 10532 of the printer driver 1053. The processing illustrated in FIG. 14 is started, for example, when the user presses an update button in a management application 309.

The management application 309 will be supplementarily described below. The management application 309 is a module that performs management settings for the printer driver 1053, such as the acquisition and setting of configuration information of the printer 201 and the restriction of color printing. In the present exemplary embodiment, the management application 309 acquires the user-set paper information 802 and updates the stored printer information. The user is able to directly execute the management application 309 by operating a driver UI or indirectly execute it from another application 1051, the device application 1052, the printer driver 1053, and the OS 1054.

In step S1401, the management application 309 acquires the printer information from the printer 201. In the present exemplary embodiment, the management application 309 acquires information about the user-set paper added to the printer 201 after installation of the printer driver 1053. Although the specific information about the user-set paper acquired in step S1401 depends on the acquisition method and parameter specifications in an acquisition request, the management application 309 acquires contents equivalent to the information 802 including, for example, the paper name and physical characteristics such as grammage and surface nature. The network 1061 may be a wired or wireless communication unit of any type such as a USB, as long as it enables communication between the printer 201 and the client computer 100.

In step S1402, the management application 309 acquires the acquired printer information 801 stored in the QPB area 304.

In step S1403, the management application 309 determines whether the information acquired in step S1401 coincides with the information acquired in step S1402. When the relevant pieces of information coincide with each other (YES in step S1403), the management application 309 determines that no information has been updated. Then, the processing is terminated. On the other hand, when the relevant pieces of information do not coincide with each other (NO in step S1403), the processing proceeds to step S1404.

In step S1404, the management application 309 writes the printer information acquired in step S1401 in the QPB area 304. In this case, the management application 309 may embed original extended capability information therein as required.

Performing the above-described processing enables acquiring printer information from the printer 201 and updating the acquired printer information 801.

Examples of timings (methods) for updating the printer information via the management application 309 will be described below. A first method is a method of explicitly performing the update processing. More specifically, the user activates a dedicated application such as a management application and then presses the update button. A second method is a method of performing the update processing in association with installation operations. More specifically, the installer of the device application 1052 or the management application 309 is executed, and modules including processing of the management application 309 are stored in the auxiliary storage apparatus 105. Subsequently, as post-processing for the installer of the device application 1052 or the management application 309, the method performs the processing illustrated in FIG. 14. Alternatively, the update processing may be executed at the execution timing of the processing for the "Change" button in an installation program management screen such as "Delete Programs", or a dedicated "Acquire Paper Information" button may be added. A third method is a method of using services and the task scheduler of the OS 1054. The task scheduler executes the update processing at a predetermined timing such as "at the time of user login" and "at the time of PC activation" or at a periodical timing such as "at predetermined intervals" and "at a specified time". Alternatively, the method may utilize a mechanism for issuing a notification about a printer information update event issued from the OS 1054.

The present exemplary embodiment has been described above based on example methods performed when a new paper type is added to the printer 201, i.e., methods required to display and set the paper type added to the printer 201 in both the print setting screen 901 and the advanced setting screen 1001. However, similar processing can be performed on the printer information including information other than the paper size as long as the information relates to printer settings and functions which may possibly be changed after installation of the printer driver 1053.

Figure 12A:
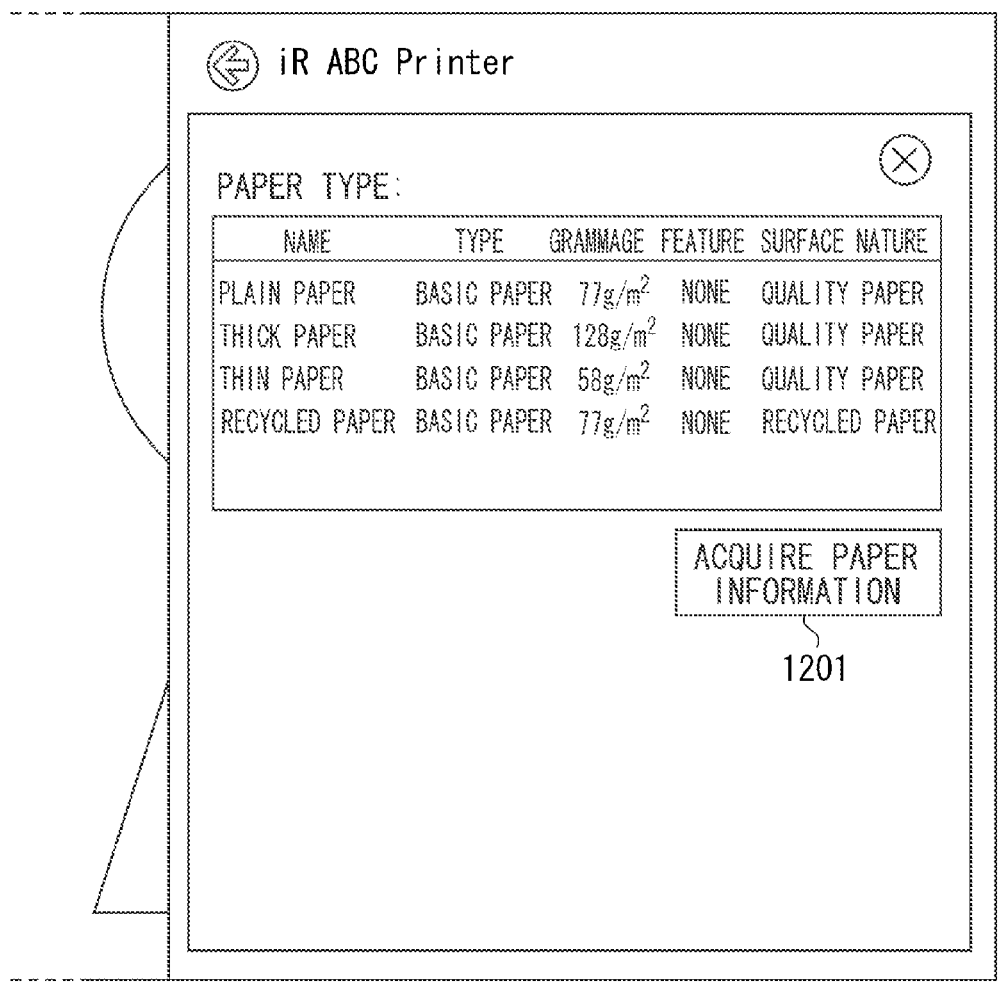
FIGS. 12A and 12B illustrate examples of a paper type acquisition screen in the advanced setting screen according to an exemplary embodiment of the present invention.
Figure 12B:
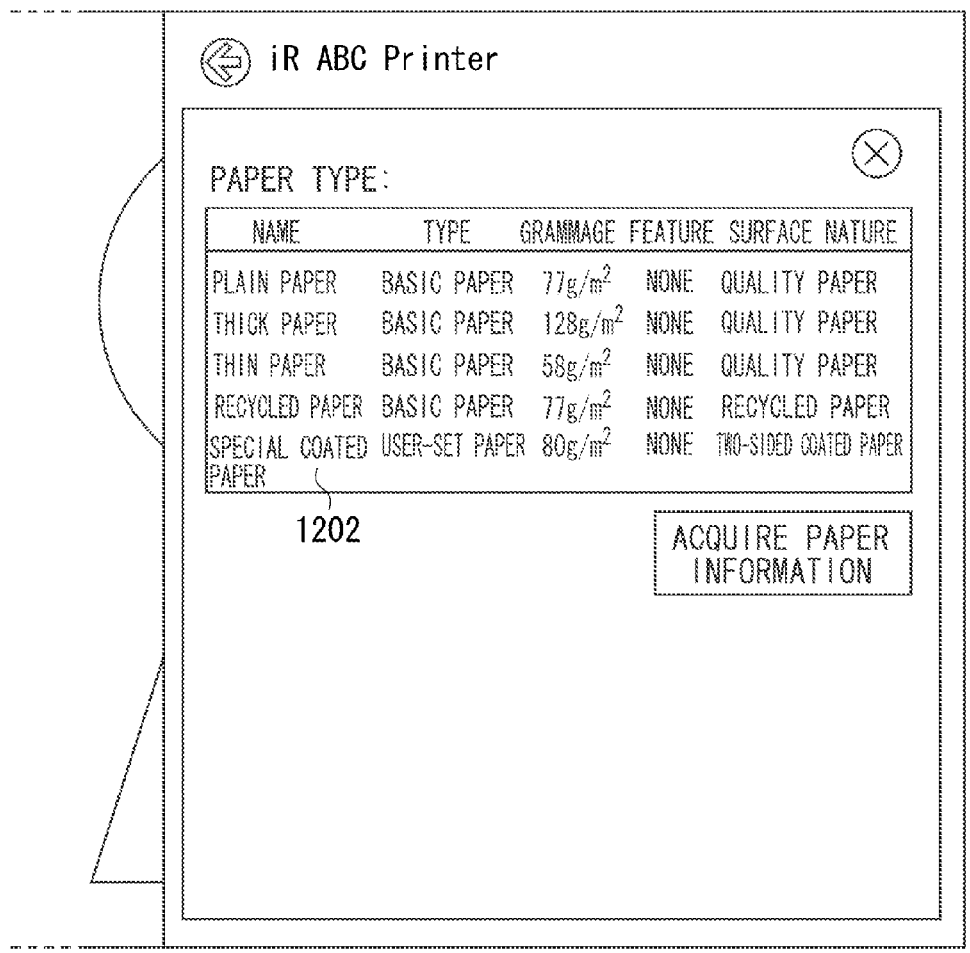

In the first exemplary embodiment, the acquired printer information 801 is stored in the QPB area 304. However, an access right higher than a predetermined level is required, for example, to update the contents of the QPB area 304, but the user does not necessarily accesses the QPB area 304 under the administrative user authority during printing. In addition, with some mobile-conscious applications such as Windows (registered trademark) StoreDeviceApp, basically, the upgrade to the administrative user authority is not possible. Therefore, even if a general user presses an Acquire Paper Information button 1201 illustrated in FIG. 12A during operation of a driver UI such as the advanced setting screen 1001, the user may be unable to display user-set paper on the advanced setting screen 1001.

Therefore, in a second exemplary embodiment, using the UPB area 305 as a data storage target instead of the QPB area 304 used in the first exemplary embodiment enables acquiring extended capabilities of the printer 201 and making settings even from an application not having the administrative user authority.

Figure 13:
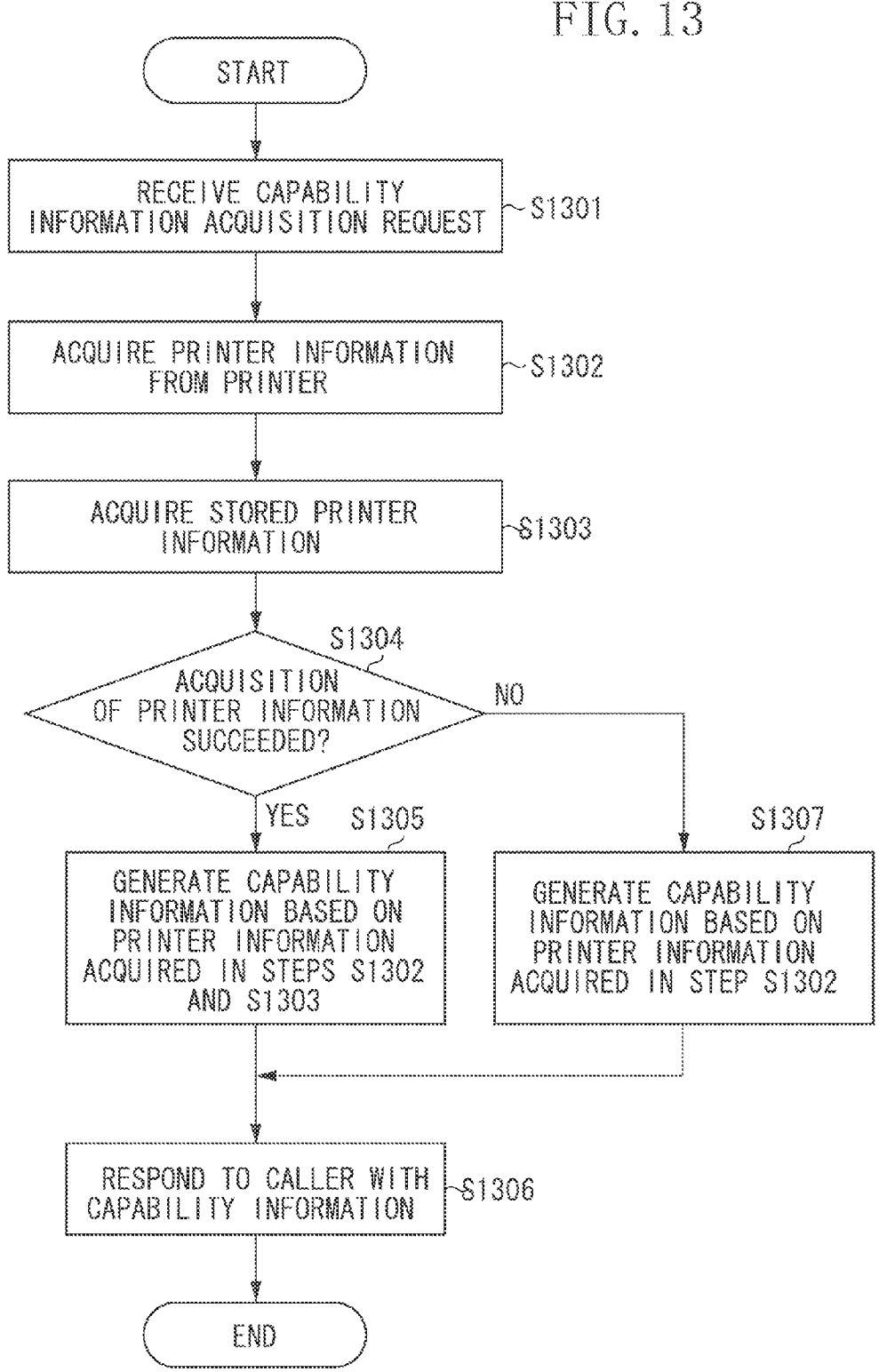
FIG. 13 is a flowchart illustrating processing for generating printer information.

More specifically, the present exemplary embodiment is implemented by modifying the flowchart illustrated in FIG. 14 for acquiring data and the flowchart illustrated in FIG. 13 for regenerating printer information.

Referring to FIG. 13, when acquiring driver data in step S1303, the device application 1052 uses the UPB area 305 as a driver data acquisition target in addition to the QPB area 304. Some of example methods for acquiring driver data will be described below. A first method is a method of simply giving priority to either the UPB area 305 or the QPB area 304 (in a case where the UPB area 305 exists, only the data of the UPB area 305 is unconditionally handled). A second method is a method, when both the QPB area 304 and the UPB area 305 are accessible, of using data in either area having the date and time acquired later. In this case, as long as the processing target is a file, information about the date and time of file update or time stamp information embedded in data may be used. A third method is a method of merging the information in the QPB area 304 and the UPB area 305 (for example, "A, B" and "B, C" are merged to "A, B, C") in a case where both the QPB area 304 and the UPB area 305 are accessible.

Referring to FIG. 14, instead of the QPB area 304, the UPB area 305 may be used as a data access target.

Using the above-described methods enables acquiring extended capability information for the printer 201 and performing settings, while taking applications not having the administrative user authority into consideration.

The present invention can also be achieved when a program for implementing at least one of the above-described functions is supplied to a system or apparatus via a network or storage medium, and at least one processor in a computer of the system or apparatus reads and executes the program. The present invention can also be achieved by using a circuit (for example, an application specific integrated circuit (ASIC)) for implementing at least one function.

According to the present disclosure, a user-friendly print setting screen can be offered.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting.

This application claims the benefit of Japanese Patent Application No. 2014-186530, filed Sep. 12, 2014, which is hereby incorporated by reference herein in its entirety.

What is claimed is:

1. An information processing apparatus comprising:
one or more processors; and
one or more computer-readable media storing instructions that, when executed by the one or more processors, cause the information processing apparatus to perform operations comprising:
acquiring printer information from a printer;
displaying, by being called from a first print setting screen offered by an operating system, a second print setting screen offered by a device application based on the printer information, wherein the first print setting screen includes a plurality of selectable options for a print setting; and
in a case where the first print setting screen is called from the second print setting screen, transmitting, as a response, capability information based on the printer information, the capability information including information related to an additional selectable option for the print setting, the additional selectable option different from each of the plurality of selectable options,
wherein the additional selectable option for the print setting is added to the first print setting screen when the first print setting screen is displayed based on the capability information transmitted in the transmitting as the response.

2. The information processing apparatus according to claim 1, the operations further comprising:
determining whether stored printer information exists,
wherein, if the determining determines that the stored printer information does not exist, the capability information is generated and transmitted as the response based on the printer information acquired in the acquiring.

3. The information processing apparatus according to claim 1, the operations further comprising:
updating the printer information in post-processing after installation of the device application.

4. The information processing apparatus according to claim 1, wherein the printer information is periodically updated by a task scheduler of the operating system.

5. The information processing apparatus according to claim 1, wherein the printer information includes information about a type of user-set paper acquired from the printer.

6. A control method comprising:
acquiring printer information from a printer;
displaying, by being called from a first print setting screen offered by an operating system, a second print setting screen offered by a device application based on the printer information, wherein the first print setting screen includes a plurality of selectable options for a print setting; and in a case where the first print setting screen is called from the second print setting screen, transmitting, as a response, capability information based on the printer information, the capability information including information related to an additional selectable option for the print setting, the additional selectable option different from each of the plurality of selectable options, wherein the additional selectable option for the print setting is added to the first print setting screen when the first print setting screen is displayed based on the capability information transmitted in the transmitting as the response.

7. The control method according to claim 6, further comprising:

determining whether stored printer information exists, wherein, if the determining determines that the stored printer information does not exist, the capability information is generated and transmitted as the response based on the printer information acquired in the acquiring.

8. The control method according to claim 6, further comprising:

updating the printer information in post-processing after installation of the device application.

9. The control method according to claim 6, wherein the printer information is periodically updated by a task scheduler of the operating system.

10. The control method according to claim 6, wherein the printer information includes information about a type of user-set paper acquired from the printer.

11. A non-transitory computer-readable storage medium storing computer executable instructions for causing a computer to execute a method comprising:

acquiring printer information from a printer;

displaying, by being called from a first print setting screen offered by an operating system, a second print setting screen offered by a device application based on the printer information, wherein the first print setting screen includes a plurality of selectable options for a print setting; and in a case where the first print setting screen is called from the second print setting screen, transmitting, as a response, capability information based on the printer information, the capability information including information related to an additional selectable option for the print setting, the additional selectable option different from each of the plurality of selectable options, wherein the additional selectable option for the print setting is added to the first print setting screen when the first print setting screen is displayed based on the capability information transmitted in the transmitting as the response.

* * * * *